May 23, 1967  J. R. TOTH  3,321,687
BRUSHLESS OSCILLATOR FED ELECTRIC MOTOR
Filed Dec. 21, 1964

INVENTOR:
J. ROGER TOTH
By Ely, Golrick & Flynn
ATT'Y'S.

United States Patent Office 3,321,687
Patented May 23, 1967

3,321,687
BRUSHLESS OSCILLATOR FED ELECTRIC MOTOR
J. Roger Toth, Parkview, Ohio, assignor to Ametek, Inc., a corporation of Delaware
Filed Dec. 21, 1964, Ser. No. 419,869
5 Claims. (Cl. 318—138)

The present invention is concerned with the art of so-called brushless direct current motors which include stator main and feedback windings comprising part of an inverter circuit utilizing a pair of solid state switching devices, whereby the stator main windings are so energized alternatingly that the resultant alternating magnetization of the stator causes rotation of a squirrel-cage type rotor as in an induction motor.

More specifically the invention is concerned with a brushless D.C. motor of the type described having at least two like transistorized inverter circuits with the stator windings placed as two-phase windings whereby the motor is self-starting, and with the provision of novel phase lock circuit means to ensure triggering the transistors in one sequence whereby the motor will always start rotation in the same direction.

Phase-lock circuitry for this purpose is known in the prior art, using an LC network to phase-shift a reference signal from a feedback winding of one phase for application as a triggering signal for a power transistor paralleling one of the two switching transistors for the inverter circuitry of the other phase, the simultaneous conduction of the paralleled transistors establishing proper phase sequence. Such an arrangement entails the disadvantages of the high cost of a power transistor and use of a precisely tuned LC circuit.

Figure 1:
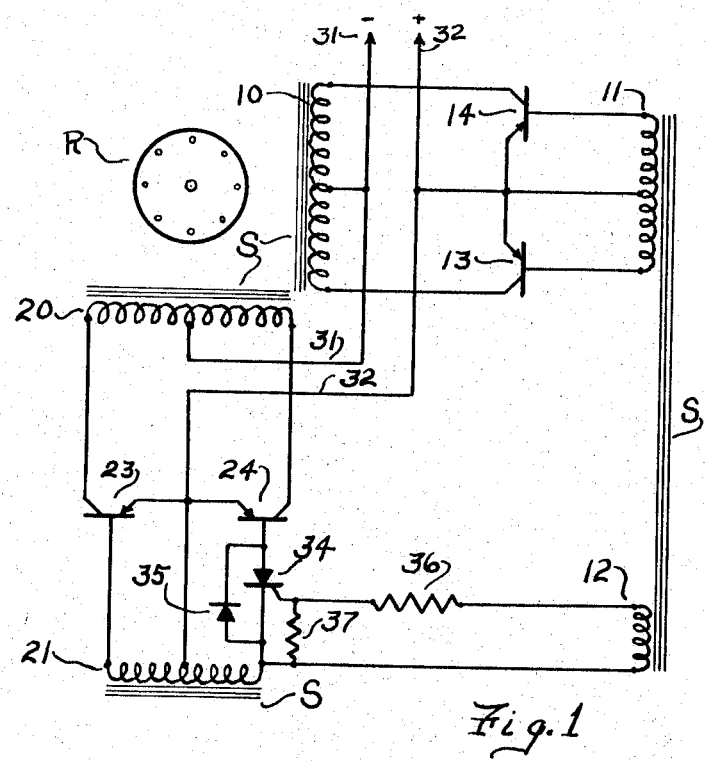
Figure 2:
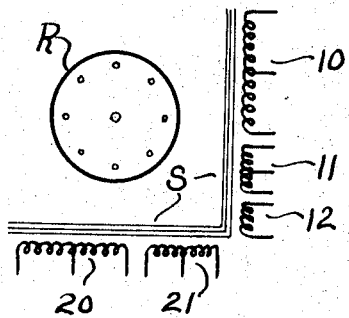

It is the general object of the present invention to provide a brushless D.C. motor having a two-phase wound stator of the type described in combination with circuit means adapted to ensure that the motor will always start in the same direction. Another object is to provide phase-lock circuitry to ensure starting in one direction in a motor of the character described which obviates one or more of the disadvantages associated with prior art circuitry of like function. Other objects and advantages will appear from the following description and the drawings wherein:

FIG. 1 is a schematic diagram of motor circuitry embodying the present invention; and FIG. 2 is a fragmentary schematic representation showing more clearly the relation of windings on the motor stator.

A form of brushless D.C. motor circuitry embodying the present invention is shown in FIG. 1, including a squirrel-cage type rotor R; a stator having its core S wound with two divided main windings 10, 20 as phase 1 and phase 2 windings, respectively associated divided feedback windings 11, 21, and with a third auxiliary feedback winding 12 associated with the phase 1 main and feedback windings as more clearly schematically indicated in FIG. 2; and respective pairs of switching transistors 13–14, 23–24. In effect, the halves of each divided winding are wound onto the core in parallel with one end connected to an opposite end of the other at the diagrammatic center tap; with each feedback winding wound upon its respective main winding.

The opposite ends of the main winding 10 and of feedback winding 11 are connected respectively to the collectors and to the bases of transistors 13–14; and with the D.C. negative input lead 31 connected to the center of main winding 10 and the positive lead 32 connected to the emitters of transistors 13–14 and to the center of feedback winding 11, there is provided an oscillator type inverter for converting direct current supplied to leads 31–32 into effectively an alternating current for the first phase main stator winding. A phase 2 inverter, essentially similar to the phase 1 inverter just described for operation at the same frequency is provided by corresponding connections between the transistors 23–24, the phase 2 main and feedback windings 20–21 and the D.C. input leads 31–32; but in the phase 2 inverter the connection of the base of transistor 24 to the respective end of phase 2 feedback winding 21 is made through the silicon controlled rectifier 34. The SCR anode is connected to the transistor base, the cathode to the feedback winding end, and the gate to a point on the voltage divider provided by the resistors 36–37 connected between the ends of the phase 1 auxiliary feedback winding 12; the lower ends of resistor 37 and winding 12 being connected also with the SCR cathode to feedback winding 21.

The diode 35 with cathode and anode respectively to the transistor 24 base and to the end of feedback winding 21 commonly with the cathode of SCR 34, assures a reverse bias across transistor 24 to permit shut off; and allows use of an SCR 34 of lower rating.

The auxiliary phase 1 feedback winding 12, with the voltage divider 36–37 thereacross and the SCR 34 gated by a potential developed across the divider upon an appropriate feedback signal from winding 12, form a phase lock circuit ensuring that the transistors in the phase 1 and phase 2 inverter will always be triggered in the same sequence to ensure motor starting in the same direction, as hereinafter explained.

Fragmentary FIG. 2, for motor circuitry otherwise identical with that described with respect to FIG. 1 is intended merely to show somewhat more clearly the relationship of all the windings on the stator core.

In motor circuitry of the type just described, were there no phase lock means and therefore the two inverter circuits had no interconnection except perhaps common D.C. input leads as would be the case with SCR 34, diode 35, resistors 36–37 and winding 12 omitted in FIG. 1, and transistor 24 connected directly to winding 21, upon applying D.C. power one transistor would be triggered before the others beginning oscillator type operation in one inverter circuit; and also there would ensue a similar oscillator type operation in the other inverter circuit, 90 electrical degrees out of phase with the first. Hence, the motor will start to rotate, but there is no assurance respecting which phase will be leading and therefore respecting the direction in which the motor will run. With the phase-lock circuit of FIG. 1, the arrangement is such that when say transistor 13 in phase 1 conducts, a signal is generated in the auxiliary feedback winding 12 sufficient to turn on SCR 34 permitting transistor 24 in the phase 2 circuit to turn on, 90 degrees before feedback is applied to transistor 24, so that upon an ensuing feedback signal to the base or control electrode of transistor 24, the latter will conduct. Thus as the sequence of operation between transistors 13 and 24 is set, a fixed phase relation between the operation of the phase 1 and phase 2 circuits, and therefore between the energizations of windings 10 and 20 is established, and hence also the direction of motor rotation.

I claim:

1. A brushless direct curent motor comprising an induction motor type rotor, a stator having a first phase divided main winding and a second phase divided main winding ninety electrical degrees from the first, first and second like feedback windings associated with respective main windings, and an auxiliary feedback winding also associated with the second main winding; a pair of solid state switching devices for each main winding, each device having a control electrode element connected to the respective feedback winding and with the respective main and feedback windings forming an inverter whereby the main winding thereof is alternatingly energized from a D.C. source; the inverters operating ninety degrees out of phase in energizing their respective main windings whereby the motor is self-starting as a two phase motor; a silicon controlled rectifier providing the connection from the control element of one said device for the first phase main winding to the associated feedback winding; and means including a voltage divider across said auxiliary feedback winding for gating said silicon controlled rectifier to establish a phase interlock whereby the starting of the motor in one direction is assured.

2. A brushless direct current motor as described in claim 1 including a diode connected with reversed polarity across the anode and cathode of said silicon controlled rectifier.

3. A brushless direct current motor comprising an induction motor type rotor, a stator having a first phase divided main winding and a second phase divided main winding ninety electrcal degrees from the first, each having a center connected to one D.C. lead, first and second like feedback windings associated with respective main windings, and an auxiliary feedback winding associated with the second main winding; a pair of transistor switching devices for each main winding having bases connected to opposite ends of the respective feedback winding and each connected through its emitter and collector between a second D.C. lead and a respective end of the associated main winding forming an inverter whereby the main winding thereof is alternatingly energized from a D.C. source; the inverters operating ninety degrees out of phase in a two phase energization of the main windings whereby the motor is self-starting as an induction motor; and a phase lock means comprising a silicon controlled rectifier providing the connection from the base of one said transistor for the first phase main winding to the associated feedback winding, a diode connected with reversed polarity across the cathode and anode of the silicon controlled rectifier, and a voltage divider across said auxiliary feedback winding providing gating for said silicon controlled rectifier whereby said one transistor is permitted to conduct in sequence only after a predetermined one of the transistors associated with the second phase main winding to assure starting of the motor in one direction.

4. In a brushless direct current motor of the type including an induction motor type rotor, a stator having windings, and inverter means including transistors, said windings, and feedback means controlling the transistors forming an inverter whereby the stator is energized for alternating magnetization from a direct current source, circuitry providing self-starting of the motor in a predetermined direction, said circuitry comprising: two inverters including two main windings at ninety electrical degrees spacing as first and second phase inverters, a bistable solid-state switching device in the first phase inverter interposed between a control element of one said transistor therein and the feedback means of the first phase, a diode in parallel with said device to provide a back bias feedback path to said transistor, said device having a control element and a rendered conducting upon a pulse in one sense applied to said element, said device turned off upon back bias applied thereto, a feedback winding associated on the stator with the main winding in the second phase inverter and means for applying pulses developed in said feedback coil to said control element whereby development of a pulse in said sense turns on said device enabling said one transistor to conduct in response to a subsequent feedback signal in the first said inverter, providing a phase lock between said inverters establishing a sequence of transistor conduction to insure motor starting in one direction.

5. In a brushless direct current motor having a rotor, a stator core, first and second phase transistorized inverters each including a main and a feedback winding on the stator, the windings of the two inverters spaced as two-phase windings, a phase lock circuit to ensure motor starting in the same direction comprising: an SCR interposed between the control element of one transistor in the first phase inverter and the feedback winding thereof, whereby the said one transistor is prevented from conducting in response to a feedback signal until the SCR is gated on, a diode connected with reversed polarity between the anode and cathode of the SCR whereby a back bias signal from the first phase feedback winding can turn off said one transistor, a third feedback winding associated with the second phase main winding, and means for applying pulses developed on said third winding to the SCR gate.

No references cited.

ORIS L. RADER, *Primary Examiner.*

G. SIMMONS, *Assistant Examiner.*

UNITED STATES PATENT OFFICE
CERTIFICATE OF CORRECTION

Patent No. 3,321,687                                    May 23, 1967

J. Roger Toth

It is hereby certified that error appears in the above numbered patent requiring correction and that the said Letters Patent should read as corrected below.

Column 4, line 14, strike out "a", first occurrence.

Signed and sealed this 21st day of November 1967.

(SEAL)
Attest:

Edward M. Fletcher, Jr.　　　　　　　　　　　　　　　EDWARD J. BRENNER
Attesting Officer　　　　　　　　　　　　　　　　　　Commissioner of Patents